Jan. 20, 1953     J. O. RABY     2,626,386
BRAKE LEVER ACTUATED OIL LEVEL INDICATOR
Filed May 25, 1951
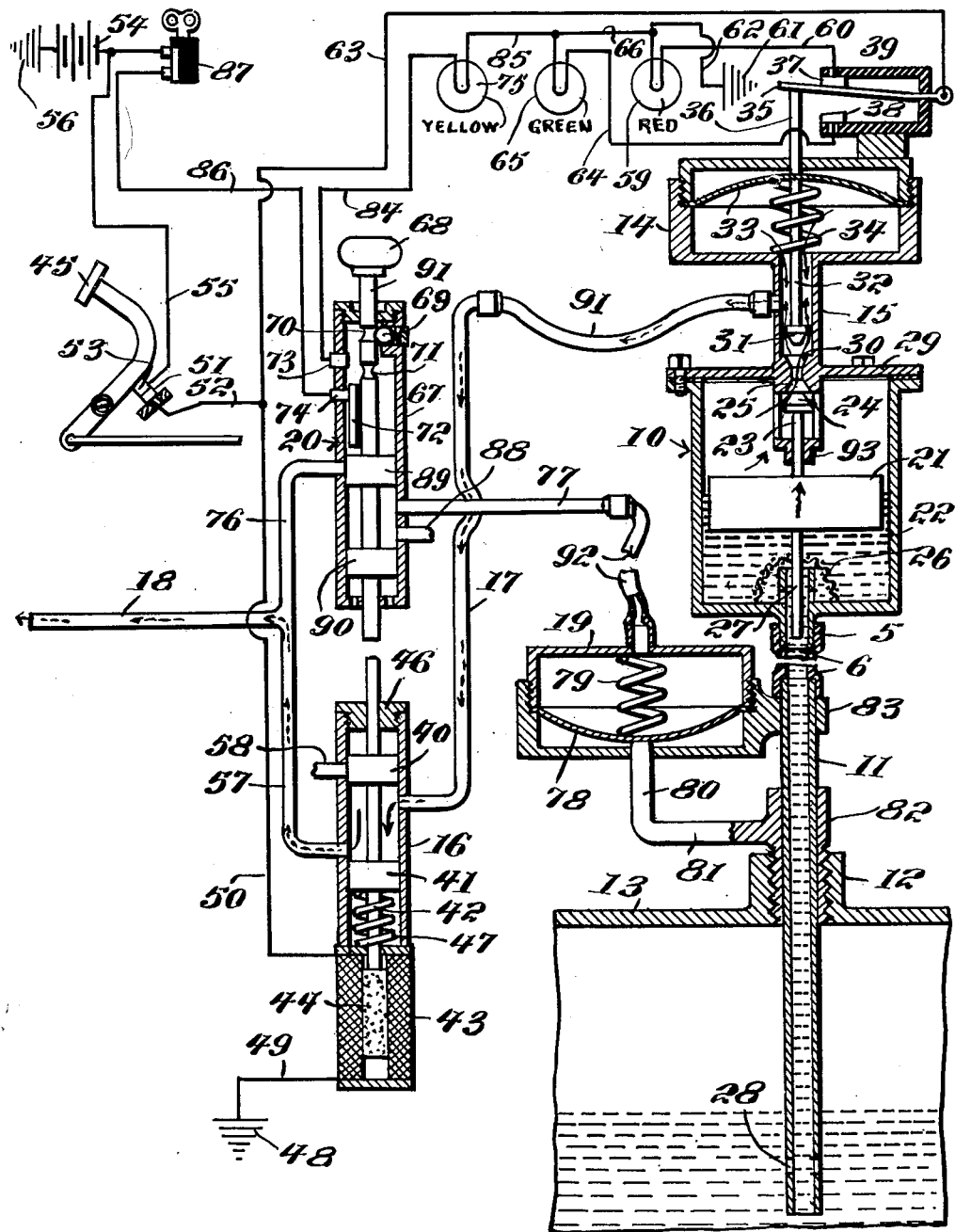
INVENTOR.
James O. Raby,
BY Victor J. Evans & Co.
ATTORNEYS

UNITED STATES PATENT OFFICE 2,626,386

BRAKE LEVER ACTUATED OIL LEVEL INDICATOR

James O. Raby, Elizabeth City, N. C.

Application May 25, 1951, Serial No. 228,167

6 Claims. (Cl. 340—244)

This invention relates to oil level indicating devices for showing the level of the oil in engine crank cases, and in particular a device that automatically indicates with colored lights the level of the oil each time the foot brake lever is actuated.

The purpose of this invention is to provide an oil level indicator that operates continuously with the operation of the vehicle.

Various types of oil level indicating devices have been used on motor vehicles, however, it has been found difficult to provide an adjustable device that shows the level of the oil without circulating the oil through the instrument board of the vehicle. With this thought in mind this invention contemplates an automatically operating device whereby upon application of the foot brake a circuit is completed to a solenoid actuated valve that admits vacuum to a float chamber connected by a hose and a tubular stem to the interior of the crank case and whereby the float chamber actutes the contacts to complete circuits to lights for indicating the level of the oil.

This invention also includes means for dropping the tube of the oil level indicating device to show whether or not a second quart of oil is required in the crank case.

The object of this invention is, therefore, to provide an oil indicating device that instantly shows the level of oil in a crank case of a motor vehicle engine when the foot brake lever is impressed.

Another object of the invention is to provide an oil level indicating device that is readily adjustable as the level of oil in the crank case varies.

A further object of the invention is to provide an improved oil level indicating device which is of a simple and economical construction.

With these and other objects and advantages in view the invention embodies a float chamber positioned at the rear of the instrument board of a vehicle and a tubular stick extended downwardly through an oil testing opening of an internal combustion engine crank case with a diaphragm for actuating circuit closing devices positioned above the float chamber, with a vacuum connection extended from the float chamber to a solenoid actuated valve and with a second diaphragm controlled by a manually actuated valve whereby the tube extended into the crank case is lowered.

Other features and advantages of the invention will appear from the following description taken in connection with the drawings wherein a float chamber 10 mounted at the inside of an instrument panel of a motor vehicle and connected by a hose to the upper end of a tube 11 which extends through a testing opening 12 in a crank case 13, is connected to a diaphragm casing 14 through a sleeve 15 and the sleeve 15 is connected to a control valve casing 16 by a tube 17 whereby vacuum from a vacuum supply connection 18 is drawn through the control valve casing 16 from the float and diaphragm casings and also from a diaphragm casing 19 through a manually actuated valve having a casing 20.

The float 21 is provided in a float chamber or casing 10 and a rod 22 extended downwardly from the float is slidable in a tube 5 to provide a valve guide. The float 21 is also provided with a stem 23 having a valve 24 on the upper end and the valve 24 is positioned to coact with a seat 25 to seal the upper end of the float chamber. A wire mesh strainer 26 is provided around the upper end of the tube 5 in the casing 10 and the tube is provided with openings 27 through which oil drawn into the chamber 10 by the vacuum passes.

The lower end of the tube 5 is connected by a hose 6 to a tube 11 which extends through an oil testing connection 12 in a crank case 13 and openings 28 in the lower end of the tube 11 are positioned to correspond with the required oil level so that when oil is drawn by vacuum through the openings 28 into the tube 11 and chamber 10 a circuit is completed to the green light whereas with the oil level below the openings 28 air, only, is drawn into the chamber 10 through the tubes 11 and 15 and a circuit is completed to the red light.

The float chamber or casing 10 is provided with a cover plate 29 and a valve seat 30 therein is positioned to coact with a valve 31 on a stem 32 that extends upwardly through the sleeve 15 and that is connected to the diaphragm 33 in the casing 14. The diaphragm is held upwardly by a spring 34 and when the valve 24 seals the upper end of the casing 10 vacuum being applied through the tube 17 draws the diaphragm 33 downwardly compressing the spring 34 and permitting the spring arm 35 to move the stem 36 downwardly whereby the spring arm 35 moves away from a contact 37 and engages a contact 38 in a switch casing 39, thereby completing a circuit to the green light.

The valve casing 16 is provided with a valve having spaced pistons 40 and 41 on a stem 42 and the stem extends downwardly into a solenoid 43 where a soft iron core 44 on the lower end of the stem 42 is actuated to open the vacuum connection whereby the vacuum connection is opened by the foot lever 45.

The upper end of the casing 16 is provided with a head 46 and a spring 47 extended around the stem and positioned between the piston 41 and upper end of the solenoid urges the stem upwardly when the solenoid is deenergized.

One side of the solenoid is connected to a ground 48 by a wire 49 and the opposite side is connected by a wire 50 to a contact 51 through a wire 52. The contact 51 is positioned to be engaged by a contact 53 on the foot brake lever 45 and the contact 53 is connected to a battery 54 by a wire 55. With the opposite terminal of the battery 54 connected to a ground 56 the circuit is completed to the solenoid 43 when the foot lever 45 is depressed whereby the solenoid draws the valve pistons 40 and 41 downwardly to the positions shown in the drawing wherein the vacuum tubes 17, 57 and 18 are in communication and whereby the vacuum is applied to the float chamber 10. When the foot lever is released the solenoid 43 is deenergized and the spring 47 moves the pistons 40 and 41 upwardly whereby the tube 17 communicates with the atmosphere through a connection 58.

By this means upon depression of the foot lever 45 the valve elements of the casing 16 are actuated by the solenoid 43 so that vacuum is applied to the sleeve 15 and from the sleeve to the float chamber 10 wherein the vacuum draws oil from the crank case 13 upwardly into the chamber 10 and the oil floats the member 21 until the valve 24 is seated in the seat 25. Under these conditions the vacuum is then applied to the casing 14 when the diaphragm 33 is drawn downwardly so that the spring arm 35 engages the contact 38 and completes a circuit to the green light, thereby showing that oil is in the crank case. Should the level of the oil be below the opening 28 oil would not be drawn into the chamber 10 and the float 21 would not move upwardly to seat the valve 24 whereby vacuum would continue to be drawn through the chamber 10 and tube 11 and the diaphragm 33 would remain in the position shown wherein the circuit is completed to the red light 59. This would indicate that oil is required in the crank case.

The contact 37 is connected to the red light 59 by a wire 60 and the opposite terminal of the light is connected to a ground 61 by a wire 62. The spring arm 35 is connected by a wire 63 through the terminals or contacts 51 of the foot brake lever and the contact 51 is connected through a contact 53 and the wire 55 to the battery 54 the opposite terminal of which is connected to the ground.

The contact 38 is connected by a wire 64 to the green light 65 and the opposite terminal of the green light is connected to the ground 61 by wires 66 and 62.

Should the device indicate that one quart of oil is required in the crank case and the vehicle in which the crank case is positioned be travelling or at such a point that it is inconvenient to obtain one quart of oil the tube 11 may be dropped to the second quart level by the valve 67. The valve 67 is manually actuated and the button 68 is drawn outwardly whereby the spring actuated ball 69 is forced out of the recess 70 and snapped into the recess 71 in which movement a contact bar 72 bridges contacts 73 and 74 closing a circuit to a yellow light 75 and applying vacuum from the tube 18 through a tube 76 on one side and from tube 77, extended from the opposite side of the valve to the upper part of the casing 19 in which a diaphragm 78 is positioned. The diaphragm is held downwardly by a spring 79 and when vacuum is applied to the upper side of the casing 19 the casing moves downwardly on a vertical section 80 of an L-shaped arm 81. The upper section 80 of the arm 81 is fixedly attached to the diaphragm 78, and the arm 81 is fixedly mounted by a bushing 82 in the boss 12 of the oil testing or filling opening of the crank case. The tube 11 is fixedly mounted in a boss 83 extended from one side of the casing 19 and with the arm 81 held stationary and the section 80 secured to the diaphragm, the casing 19 is drawn downwardly by the vacuum whereby the boss 83 slides the tube 11 downwardly through the bushing 82 and thereby lowers the openings 28 in the lower end of the tube in the crank case.

The contact 73 is connected to the yellow light 75 by a wire 84 and the opposite terminal of the light is connected to the ground 61 by wires 85, 66 and 62. The contact 74 is connected by a wire 86 to one terminal of the battery 54 through the ignition switch 87. The ignition switch is also provided with connections to the operating circuit of the vehicle.

The valve 67 is also provided with an air connection 88 and with the parts in the position shown the vacuum connection 76 is closed and the vacuum connection 77 is opened to the atmosphere through the connection 88 and the valve 67 is also provided with pistons 89 and 90 that are mounted on the stem 91 which extends from the bottom 63 in which the annular recesses 70 and 71 are provided.

With the parts arranged in this manner the tube 11 may be dropped downwardly into the crank case 13 by drawing the button 68 of the snap switch or vacuum valve 67 outwardly and with this movement the arm 81, being held stationary on the crank case, the casing 19 moves downwardly carrying the tube 11 downwardly so that the openings 28 are lowered in the crank case. To facilitate this movement the tube 11 is connected to the tube 5 with a flexible connection 6 and a similar flexible connection or hose 92 is provided in the tube 77.

With the button 68 drawn outwardly a circuit is closed to the yellow light 75 so that the operator knows that the vacuum is applied to the diaphragm operating the tube 11.

A double valve including the valve elements 24 and 31 is provided in the upper end of the float chamber 10 to seal the upper end of the float chamber and to prevent oil passing upwardly into the diaphragm casing 14 and vacuum connection 17.

The stem 23 of the float 21 is mounted with the valve 24 aligned with the valve seat 25 and the lower end of the stem is positioned in the tube 5 with the upper end held in a bearing 93 extended downwardly from the cover plate 29.

The yellow light showing the position of the tube 11 shows only when the ignition switch 87 is turned on, however, circuits to the red and green lights are completed when the foot lever is depressed whereby the level of the oil may be determined with the engine stationary.

It will be understood that modifications may be made in the design and arrangement of the parts without departing from the spirit of the invention.

What is claimed is:

1. An oil level indicator comprising a float chamber having a tube extended downwardly therefrom, a float having a valve on the upper end positioned in said float chamber, said float chamber having a valve seat in the upper end positioned to coact with the valve of the float, an upper diaphragm casing positioned above and connected to the float chamber with a sleeve, a diaphragm extended across said upper diaphragm casing, a vacuum connection extended from said sleeve, a signal light switch positioned to be actuated by the said diaphragm, a solenoid actuated valve positioned in said vacuum connection to the sleeve, a foot brake lever, contacts positioned to be closed upon operation of the foot brake lever, and a circuit connecting the contacts of the foot brake lever to a source of current supply and to the solenoid actuated valve.

2. An oil level indicator comprising a float chamber having a tube extended downwardly therefrom, a float having a valve on the upper end positioned in said float chamber, said float chamber having a valve seat in the upper end positioned to coact with the valve of the float, an upper diaphragm casing positioned above and connected to the float chamber with a sleeve, a diaphragm extended across said upper diaphragm casing, a vacuum connection extended from said sleeve, a signal light switch positioned to be actuated by the said diaphragm, a solenoid actuated valve positioned in said vacuum connection to the sleeve, a foot brake lever, contacts positioned to be closed upon operation of the foot brake lever, signal lights, and a circuit connecting the contacts of the foot brake lever to the signal lights and to a source of current supply and also to the said solenoid actuated valve.

3. An oil level indicator comprising a float chamber having a tube extended downwardly therefrom, a float having a valve on the upper end positioned in said float chamber, said float chamber having a valve seat in the upper end positioned to coact with the valve on the float, an upper diaphragm casing positioned above and connected to the float chamber with a sleeve, a diaphragm extended across said upper diaphragm casing, a vacuum connection extended from said sleeve, a signal light switch positioned to be actuated by the said diaphragm, a solenoid actuated valve positioned in said vacuum connection to the sleeve, a foot brake lever, contacts positioned to be closed upon operation of the foot brake lever, a lower diaphragm casing, a diaphragm in the said lower diaphragm casing, a stationary arm extended from the diaphragm in the said lower diaphragm casing, means actuating the said float chamber and tube depending therefrom by the lower diaphragm casing, a vacuum connection to the said lower diaphragm casing, a manually actuated valve in the vacuum connection of the said lower diaphragm casing whereby vacuum is applied to one side of the diaphragm therein to adjust the position of the float chamber tube in relation to the said stationary arm to which the diaphragm of the lower diaphragm casing is attached, and circuits connecting the parts to a source of current supply.

4. In an oil level indicator, the combination which comprises a float chamber having a tube extended downwardly therefrom, a crankcase having an opening therein through which the tube of the float chamber extends, a float having a valve extended upwardly therefrom positioned in the float chamber, said float chamber having a valve seat in the upper end positioned to coact with the valve on the float, an upper diaphragm casing positioned above the float chamber, a sleeve positioned around the valve seat of the float chamber connecting the float chamber to the upper diaphragm casing, a diaphragm extended across the said upper diaphragm casing, a lower diaphragm casing connected to the tube extended downwardly from the float chamber, a diaphragm in the lower diaphragm casing connected to a stationary arm, vacuum connections extended from the sleeve between the float chamber and upper diaphragm casing and from the upper part of the lower diaphragm casing, a solenoid actuated valve in the vacuum connection extended from the sleeve, and a manually actuated valve in the vacuum connection extended from the lower diaphragm casing.

5. In an oil level indicator, the combination which comprises a float chamber having a tube extended downwardly therefrom, a crankcase having an opening therein through which the tube of the float chamber extends, a float having a valve extended upwardly therefrom positioned in the float chamber, said float chamber having a valve seat in the upper end positioned to coact with the valve on the float, an upper diaphragm casing positioned above the float chamber, a sleeve positioned around the valve seat of the float chamber connecting the float chamber to the upper diaphragm casing, a diaphragm extended across the said upper diaphragm casing, a lower diaphragm casing connected to the tube extended downwardly from the float chamber, a diaphragm in the lower diaphragm casing connected to a stationary arm, vacuum connections extended from the sleeve between the float chamber and upper diaphragm casing and from the upper part of the lower diaphragm casing, a solenoid actuated valve in the vacuum connection extended from the sleeve, a manually actuated valve in the vacuum connection extended from the lower diaphragm casing, a foot lever, contacts positioned to be closed by the said foot lever, signal lights, and circuits connecting the contacts of the foot lever to the signal lights and contacts of the manually actuated valve in the vacuum connection to the lower diaphragm casing and to a source of current supply.

6. In an oil level indicator, the combination which comprises a float chamber having a tube extended downwardly therefrom, a crankcase having an opening therein through which the tube of the float chamber extends, a float having a valve extended upwardly therefrom positioned in the float chamber, said float chamber having a valve seat in the upper end positioned to coact with the valve on the float, an upper diaphragm casing positioned above the float chamber, a sleeve positioned around the valve seat of the float chamber connecting the float chamber to the upper diaphragm casing, a diaphragm extended across the said upper diaphragm casing, a lower diaphragm casing connected to the tube extended downwardly from the float chamber, a diaphragm in the lower diaphragm casing connected to a stationary arm, vacuum connections extended from the sleeve between the float chamber and upper diaphragm casing and from the upper part of the lower diaphragm casing, a solenoid actuated valve in the vacuum connection extended from the sleeve, a manually actuated valve in the vacuum connection extended from the lower diaphragm casing, a foot lever, contacts positioned to be closed by the said foot lever, signal lights, circuits connecting the contacts of the foot lever to the signal lights and contacts of the manually actuated valve in the vacuum connection to the lower diaphragm casing and to a source of current supply, and a switch positioned to be actuated by the diaphragm of the said upper diaphragm casing for breaking the circuit to one of said signal lights and completing a circuit to another of said signal lights.

JAMES O. RABY.

REFERENCES CITED

The following references are of record in the file of this patent:

UNITED STATES PATENTS

| Number | Name | Date |
|---|---|---|
| 2,141,325 | Werder | Dec. 27, 1938 |
| 2,588,761 | Raby | Mar. 11, 1952 |